United States Patent
Fuller et al.

(10) Patent No.: US 9,178,238 B2
(45) Date of Patent: Nov. 3, 2015

(54) RUBBER CRACK MITIGANTS IN POLYELECTROLYTE MEMBRANES

(75) Inventors: Timothy J. Fuller, Pittsford, NY (US);
Lijun Zou, Rochester, NY (US);
Michael R. Schoeneweiss, West Henrietta, NY (US); James Mitchell, Bloomfield, NY (US)

(73) Assignee: GM Global Technology Operations, LLC, Detroit, MI (US)

( * ) Notice: Subject to any disclaimer, the term of this patent is extended or adjusted under 35 U.S.C. 154(b) by 592 days.

(21) Appl. No.: 13/438,417

(22) Filed: Apr. 3, 2012

(65) Prior Publication Data
US 2013/0260279 A1 Oct. 3, 2013

(51) Int. Cl.
*H01M 8/10* (2006.01)
*C08J 5/22* (2006.01)

(52) U.S. Cl.
CPC ............ *H01M 8/1032* (2013.01); *C08J 5/2237* (2013.01); *H01M 8/1046* (2013.01); *H01M 8/1067* (2013.01); *H01M 8/1069* (2013.01); *H01M 8/1081* (2013.01); *C08J 2327/12* (2013.01); *C08J 2421/00* (2013.01); *H01M 2300/0091* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 7,888,433 B2 | 2/2011 | Fuller et al. | |
| 7,897,691 B2 | 3/2011 | MacKinnon et al. | |
| 7,897,692 B2 | 3/2011 | MacKinnon et al. | |
| 7,897,693 B2 | 3/2011 | MacKinnon et al. | |
| 8,030,405 B2 | 10/2011 | MacKinnon et al. | |
| 8,053,530 B2 | 11/2011 | Fuller et al. | |
| 2007/0099054 A1 | 5/2007 | Fuller et al. | |
| 2009/0280383 A1* | 11/2009 | MacKinnon et al. | 429/33 |
| 2011/0300469 A1* | 12/2011 | Ono et al. | 429/483 |

FOREIGN PATENT DOCUMENTS

| | | |
|---|---|---|
| CN | 101608041 A | 12/2009 |
| CN | 102318011 A | 1/2012 |

* cited by examiner

*Primary Examiner* — Sarah A Slifka
(74) *Attorney, Agent, or Firm* — Brooks Kushman P.C.

(57) ABSTRACT

A membrane electrode assembly for a fuel cell includes an anode catalyst layer, a cathode catalyst layer, and an ion conducting membrane. The ion conducting membrane is interposed between the anode catalyst layer and the cathode catalyst layer. The ion conducting membrane includes an ion conducting polymer having sulfonic acid groups and rubber particulates. Characteristically, the rubber particulates have an average spatial dimension less than about 600 nanometers. A fuel cell incorporating the membrane electrode assembly is also provided.

22 Claims, 7 Drawing Sheets

RUBBER CRACK MITIGANTS IN POLYELECTROLYTE MEMBRANES

FIELD OF THE INVENTION

In at least one aspect, the present invention relates to proton exchange membranes for fuel cells with improved mechanical durability.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

One method of forming an MEA involves depositing an electrode ink on the PEM by direct spraying or coating in a shim frame. The electrode can be formed on a decal and transferred to the PEM. Alternatively, the catalyst/ionomer ink can be coated on a gas diffusion medium (GDM) substrate, which is known as a catalyst coated diffusion media (CCDM).

Electrode inks typically include a powder catalyst on a support, such as a carbon support, and an ionomer solution which is dispersed in a mixed solvent. The mixed solvent usually contains one or more organic solvents, such as alcohols, and water in a specific ratio that depends on the type of catalyst. The mixture is then homogenized by ball-milling for up to about 3 days before coating on the PEM, decal substrate, or GDM. For shim coating, the catalyst loading can be controlled by the thickness of the shim; for the Mayer wire-wound rod coating, the catalyst loading can be controlled by the wire number. Multiple coatings can be applied for higher catalyst loading, as needed. After applying the wet ink, the solvents are dried in an oven to drive off the solvent and form the electrode. After the catalyst/ionomer coated decal dries, the catalyst/ionomer is then transferred onto a PEM by hot press to form an MEA. The anode and cathode can be hot-pressed onto a PEM simultaneously. The pressure and time for the hot press may vary for different types of MEAs.

Although the polymer membrane currently used in PEM fuel cells works reasonably well, such membrane are susceptible to crack propagation and mechanical failure.

Accordingly, there is a need for a new method of reducing mud cracking in catalyst layers in fuel cells.

SUMMARY OF THE INVENTION

The present invention solves one or more problems of the prior art by providing a membrane electrode assembly for a fuel cell. The membrane electrode assembly includes an anode catalyst layer, a cathode catalyst layer, and an ion conducting membrane. The ion conducting membrane is interposed between the anode catalyst layer and the cathode catalyst layer. The ion conducting membrane includes an ion conducting polymer having sulfonic acid groups and rubber particulates. Characteristically, the rubber particulates have an average spatial dimension less than about 600 nanometers In another embodiment, a fuel cell incorporating the membrane electrode assembly set forth above is provided. The fuel cell includes a membrane electrode assembly that has an anode catalyst layer, a cathode catalyst layer, and an ion conducting membrane. The ion conducting membrane is interposed between the anode catalyst layer and the cathode catalyst layer and includes an ion conducting polymer having sulfonic acid groups and rubber particulates. Characteristically, the rubber particulates have an average spatial dimension less than about 600 nanometers. A first gas diffusion layer is disposed over the anode catalyst layer and a second gas diffusion layer is disposed over the cathode catalyst layer. The fuel cell also includes an anode flow field plate disposed over the first gas diffusion layer and a cathode flow field plate disposed over the second gas diffusion layer.

BRIEF DESCRIPTION OF THE DRAWINGS

Exemplary embodiments of the present invention will become more fully understood from the detailed description and the accompanying drawings, wherein.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein "polyoctenamer" refers to a linear polymer from cyclooctene (i.e., [—(CH$_2$)$_6$—CH=CH—]$_n$, where the ratio of cis to trans is about 1:4).

Figure 1:
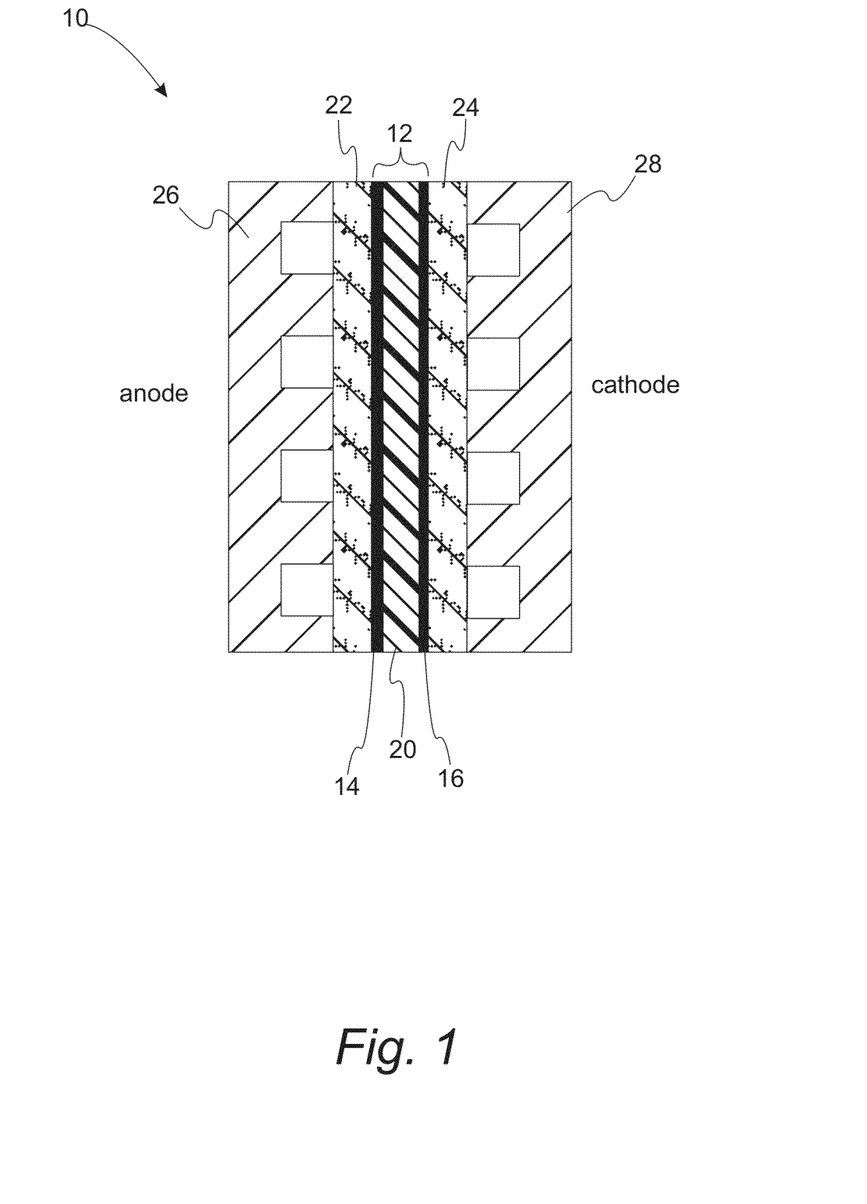
FIG. 1 is a schematic illustration of a fuel cell that incorporates a PEM with reinforced anisotropic layers.

With reference to FIG. 1, a fuel cell having a membrane electrode assembly that includes rubber particulates is provided. Fuel cell 10 includes the membrane electrode assembly 12 which includes anode catalyst layer 14, cathode catalyst layer 16, and ion conducting membrane (i.e., proton exchange membrane) 20. Ion conducting membrane 20 is interposed between anode catalyst layer 14 and cathode catalyst layer 16. Characteristically, ion (i.e., proton) conducting membrane 20 includes an ion conducting polymer (i.e., an ionomer) having sulfonic acid groups and rubber particulates. In a variation, fuel cell 10 also includes porous gas diffusion layers 22 and 24. Gas diffusion layer 22 is disposed over anode catalyst layer 14 while gas diffusion layer 24 is disposed over cathode catalyst layer 16. In yet another variation, fuel cell 10 includes anode flow field plate 26 disposed over gas diffusion layer 22 and cathode flow field plate 28 disposed over gas diffusion layer 24.

In a refinement, the rubber particulates are present in an amount from about 0.1 to 50 weight percent of the total weight of the ion conducting membrane. In another refinement, the rubber particulates are present in an amount from about 5 to 10 weight percent of the total weight of the ion conducting membrane. Typically, the rubber particulates have an average spatial dimension less than about 600 nanometers (i.e., at least one of the three dimensions that define an object is less than about 600 nanometers). In a refinement, the rubber particulates have a spatial dimension less than about 300 nanometers. In still another refinement, the particulates having an average diameter from about 50 to 400 nanometers. In another refinement, the rubber particulates are substantially spherical, ellipsoidal, fiber-shaped, and/or combinations thereof.

In another refinement, the rubber particulates comprise a component selected from the group consisting of polyoctenamer, polybutadiene, polystyrene-polybutadiene, syndiotactic poly-1,2-butadiene, polychloroprene, polyvinylidene fluoride, and other rubbers, and combinations thereof.

As set forth above, membrane electrode assembly 12 includes an anode catalyst layer 14 and cathode catalyst layer 16. In a variation, these catalyst layers are formed of porous conductive materials, such as woven graphite, graphitized sheets, or carbon paper to enable the fuel and oxidant to disperse over the surface of the membrane facing the fuel- and oxidant-supply electrodes, respectively. Each catalyst layer has finely divided catalyst particles (for example, platinum particles) supported on carbon particles to promote oxidation of hydrogen at the anode and reduction of oxygen at the cathode. In another variation, the catalyst layers are formed by depositing a catalyst ink on ion conducting membrane 20 by direct spraying or coating in a shim frame. In still another variation, the catalyst layers are formed on a decal and transferred to ion conducting membrane 20. Alternatively, a catalyst/ionomer ink can be coated on a gas diffusion medium substrate, which is known as a catalyst coated diffusion media (CCDM). The catalyst inks are typically prepared as a solution of a proton conducting polymer or ionomer (e.g. Nafion), with particles of electrically conductive material, typically carbon, and particles of catalyst. The electrically conductive material, e.g., carbon, is typically the catalyst support of the ink and the catalyst is typically a metal. In a variation, the catalyst layer dispersion consists of a mixture of the precious metal catalyst supported on high surface carbon (e.g., Vulcan XC-72) and an ionomer solution such as Nafion™ (DuPont Fluoroproducts, NC) in a solvent. Examples of useful catalysts include, but are not limited to, metals such as platinum, palladium; and mixtures of metals platinum and molybdenum, platinum and cobalt, platinum and ruthenium, platinum and nickel, and platinum, and tin. The ionomer is typically purchased in a solvent and at the desired initial concentration. Additional solvent is optionally added to adjust the ionomer concentration to a desired concentration. In a refinement, the catalyst inks optionally contain polytetrafluoroethylene. The catalyst and catalyst support are dispersed in the ink by techniques such as ultrasonication or ball-milling. Typically, the average agglomerate size is in the range from 50 to 500 nm. In a refinement, the ink includes an amount on the order of 0.5 to 5 grams of 5 to 80 wt. % catalytically active material on carbon (e.g., platinum on carbon), and on the order of 5 to 20 grams of 1 to 30 wt. % ionomer solution with a solvent. In still another refinement, the weight ratio of ionomer to carbon is in the range of 0.20:1 to 2.0:1. In another refinement, the weight ratio of ionomer to carbon is in the range of 0.25:1 to 1:1. In still another refinement, the ratio of solids to liquids in the ink is in the range 0.15:1 to 0.35:1 (i.e., 13% to 27% by weight solids). A more preferred range is 0.2:1 to 0.3:1 or 16% to 23% by weight of solids in the slurry. In a particular refinement, the solvent makes up about 80% of the ink weight, and catalyst, ionomer, and carbon makes up the remaining 20%.

Useful solvents include, but are not limited to, alcohols (e.g., propanol, ethanol, methanol), water, or a mixture of water and alcohols. Characteristically, the solvents evaporate at room temperature.

In another variation, the catalyst ink is homogenized by ball-milling for about three days before coating on the PEM, decal substrate, or gas diffusion medium. For shim coating, the catalyst loading can be controlled by the thickness of the shim; for the Mayer wire-wound rod coating, the catalyst loading can be controlled by the wire number. Multiple coatings can be applied for higher catalyst loading, as needed. After applying the wet ink, the solvents are dried in an oven to drive off the solvent and form the electrode. After the catalyst/ionomer coated decal dries, the catalyst/ionomer is then transferred onto a PEM by hot press to form an MEA. The anode and cathode can be hot-pressed onto a PEM simultaneously.

As set forth above, membrane electrode assembly 12 includes an ion conducting polymer having sulfonic acid groups. Examples of such ion conducting polymers include, but are not limited to, perfluorosulfonic acid (PFSA) polymers, polymers having perfluorocyclobutyl moieties, and combinations thereof. Examples of useful PFSA polymers include a copolymer containing a polymerization unit based on a perfluorovinyl compound represented by:

$$CF_2=CF-(OCF_2CFX^1)_m-O_r-(CF_2)_q-SO_3H$$

where m represents an integer of from 0 to 3, q represents an integer of from 1 to 12, r represents 0 or 1, and $X^1$ represents a fluorine atom or a trifluoromethyl group and a polymerization unit based on tetrafluoroethylene. Suitable polymers having cyclobutyl moieties are disclosed in U.S. Pat. Pub. No. 2007/0099054, U.S. Pat. No. 7,897,691 issued Mar. 1, 2011; U.S. Pat. No. 7,897,692 issued Mar. 1, 2011; U.S. Pat. No. 7,888,433 issued Feb. 15, 2011, U.S. Pat. No. 7,897,693 issued Mar. 1, 2011; and U.S. Pat. No. 8,053,530 issued Nov. 8, 2011, the entire disclosures of which are hereby incorporated by reference. In a variation, the ion-conducting polymer having perfluorocyclobutyl moieties includes a polymer segment comprising polymer segment 1:

$$E_0\text{-}P_1\text{-}Q_1\text{-}P_2 \qquad 1$$

wherein:

$E_0$ is a moiety, and in particular, a hydrocarbon-containing moiety, that has a protogenic group such as $-SO_2X$, $-PO_3H_2$, $-COX$, and the like;

$P_1$, $P_2$ are each independently absent, $-O-$, $-S-$, $-SO-$, $-CO-$, $-SO_2-$, $-NH-$, $NR_2-$, or $-R_3-$;

$R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

X is an —OH, a halogen, an ester, or

$R_4$ is trifluoromethyl, $C_{1-25}$ alkyl, $C_{1-25}$ perfluoroalkylene, $C_{1-25}$ aryl, or $E_1$ (see below); and $Q_1$ is a fluorinated cyclobutyl moiety.

In a variation of the present invention, the ion-conducting polymer comprises polymer segments 2 and 3:

$$[E_1(Z_1)_d]\text{—}P_1\text{-}Q_1\text{-}P_2 \qquad 2$$

$$E_2\text{-}P_3\text{-}Q_2\text{-}P_4 \qquad 3$$

wherein:

$Z_1$ is absent or a protogenic group such as $-SO_2X$, $-PO_3H_2$, $-COX$, and the like;

$E_1$ is an aromatic containing moiety;

$E_2$ is an unsulfonated aromatic-containing and/or aliphatic-containing moiety;

X is an —OH, a halogen, an ester, or d is the number of $Z_1$ attached to $E_1$;

$P_1$, $P_2$, $P_3$, $P_4$ are each independently absent, $-O-$, $-S-$, $-SO-$, $-CO-$, $-SO_2-$, $-NH-$, $NR_2-$, or $-R_3-$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and

$Q_1$, $Q_2$ are each independently a fluorinated cyclobutyl moiety.

In one refinement, d is equal to the number of aromatic rings in $E_1$. In another refinement, each aromatic ring in $E_1$ can have 0, 1, 2, 3, or 4 $Z_1$ groups.

In another variation of the present embodiment, the ion-conducting polymer comprises segments 4 and 5:

$$\begin{array}{c} E_1-P_1-Q_1-P_2 \\ | \\ R_8(Z_1)_d \end{array} \qquad 4$$

$$E_2-P_3-Q_2-P_4 \qquad 5$$

wherein:

$Z_1$ is absent or a protogenic group such as $-SO_2X$, $-PO_3H_2$, $-COX$, and the like;

$E_1$, $E_2$ are each independently an aromatic-containing and/or aliphatic-containing moiety;

X is an —OH, a halogen, an ester, or d is the number of $Z_1$ attached to $R_8$;

$P_1$, $P_2$, $P_3$, $P_4$ are each independently absent, $-O-$, $-S-$, $-SO-$, $-CO-$, $-SO_2-$, $-NH-$, $NR_2-$, or $-R_3-$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and

$Q_1$, $Q_2$ are each independently a fluorinated cyclobutyl moiety.

In a refinement of this variation, $R_8$ is $C_{1-25}$ alkylene, $C_{1-25}$ perfluoroalkylene, perfluoroalkyl ether, alkylether, or $C_{1-25}$ arylene. In one refinement, d is equal to the number of aro- matic rings in $R_8$. In another refinement, each aromatic ring in $R_8$ can have 0, 1, 2, 3, or 4 $Z_1$ groups. In still another refinement, d is an integer from 1 to 4 on average.

In another variation of the present embodiment, the ion-conducting polymer having perfluorocyclobutyl moieties comprises polymer segments 6 and 7:

(6)

(7)

connected by a linking group $L_1$ to form polymer units 8 and 9:

wherein:
$Z_1$ is absent or a protogenic group such as —$SO_2X$, —$PO_3H_2$, —COX, and the like;
$E_1$ is an aromatic-containing moiety;
$E_2$ is an unsulfonated aromatic-containing and/or aliphatic-containing moiety;
$L_1$ is a linking group;
X is an —OH, a halogen, an ester, or d is a number of $Z_1$ functional groups attached to $E_1$;
$P_1$, $P_2$, $P_3$, $P_4$ are each independently absent, —O—, —S—, —SO—, —$SO_2$—, —CO—, —NH—, $NR_2$—, —$R_3$—, and
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$Q_1$, $Q_2$ are each independently a fluorinated cyclobutyl moiety;
i is a number representing the repetition of polymer segment 6 with i typically being from 1 to 200; and
j is a number representing the repetition of a polymer segment 7 with j typically being from 1 to 200. In one refinement, d is equal to the number of aromatic rings in $E_1$. In another refinement, each aromatic ring in $E_1$ can have 0, 1, 2, 3, or 4 $Z_1$ groups.

In still another variation of the present embodiment, the ion-conducting polymer having perfluorocyclobutyl moieties includes polymer segments 10 and 11:

(10)

(11)

wherein:
$Z_1$ is absent or a protogenic group such as —$SO_2X$, —$PO_3H_2$, —COX, and the like;
$E_1$, $E_2$ are each independently an aromatic or aliphatic-containing moiety wherein at least one of $E_1$ and $E_2$ includes an aromatic containing moiety substituted with $Z_1$;

X is an —OH, a halogen, an ester, or d is the number of $Z_1$ functional groups attached to $E_1$;
f is the number of $Z_1$ functional groups attached to $E_2$;
$P_1$, $P_2$, $P_3$ are each independently absent, —O—, —S—, —SO—, —$SO_2$—, —CO—, —NH—, $NR_2$—, or —$R_3$—;
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, perfluoroalkyl ether, alkyl ether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety,
with the proviso that when d is greater than zero, f is zero and when f is greater than zero, d is zero. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average. In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average. In a variation, polymer segments 10 and 11 are each independently repeated 1 to 10,000 times to form respective polymer blocks that may be joined with a linking group $L_1$ shown below.

In another variation of the present embodiment, the ion-conducting polymer comprises:

(12)

wherein:
$Z_1$ is hydrogen or a protogenic group such as —$SO_2X$, —$PO_3H_2$, —COX, and the like;
$E_1$ is an aromatic containing moiety;
A is absent or oxygen (O) or a chain extender having a carbon backbone;
X is an —OH, a halogen, an ester, or $P_1$, $P_2$ are each independently absent, —O—, —S—, —SO—, —$SO_2$—, —CO—, —NH—, $NR_2$—, or —$R_3$—, and
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety.

In a variation of the present embodiment, polymer segment 12 is repeated j times to form a polymer block described by formula 13.

13

In a refinement, j is from about 1 to 10,000. In another refinement, j is from about 2 to about 100. In another refinement, j is from about 3 to about 50. In still another refinement, j is from about 4 to about 40.

In a variation of the present invention, the polymer having polymer segment 1 includes a second polymer segment having formula 14:

$$E_2\text{-}P_3\text{-}Q_2\text{-}P_4 \qquad 14$$

wherein:
$E_2$ is an aromatic containing moiety;
$P_3$, $P_4$ are each independently absent, —O—, —S—, —SO—, —SO$_2$—, —CO—, —NH—, NR$_2$—, or —R$_3$—, and
$R_2$ is $C_{1-25}$ alkyl, C1-25 aryl, or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_2$ group; and
$Q_2$ is a fluorinated cyclobutyl moiety.

In a refinement, polymer segment 14 is repeated k times to form polymer block 15:

15

In a refinement, k is from about 1 to about 10,000. In another refinement, k is from about 2 to about 100. In another refinement, k is from about 3 to about 50. In still another refinement, k is from about 4 to about 40.

In another variation, polymer blocks 13 and 15 are connected by a linking group $L_1$:

Examples for $Q_1$ and $Q_2$ in the above formulae are:

In each of the formulae 1-15, $E_1$ and $E_2$ include one or more aromatic rings. For example, $E_1$ and $E_2$, include one or more of the following moieties:

Examples of $L_1$ include the following linking groups:

[chemical structures of linking groups shown]

where $R_5$ is an organic group, such as an alkyl or acyl group.

With regards to new PFCB moiety structures for membranes, high free volume PFCB ionomers with the following $E_1$ and $E_2$ are relevant as derived from the following PFCB "monomers":

[chemical structures of PFCB monomers shown]

Other relevant $E_1$ and $E_2$ groups imparting high-free volume to the ionomers include the following:

The following examples illustrate the various embodiments of the present invention. Those skilled in the art will recognize many variations that are within the spirit of the present invention and scope of the claims.

Example 1

Preparation of Polyoctenamer Nanoparticles

Figure 2:
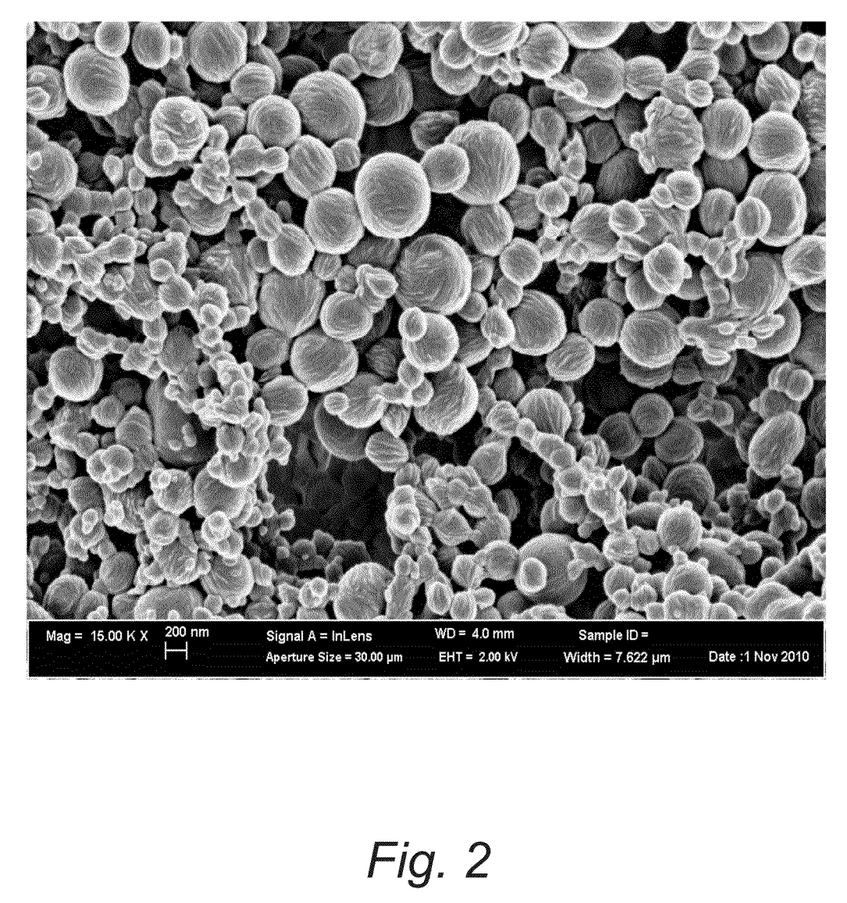
FIG. 2 is a scanning electron micrograph of polyoctenamer spheres having a diameter between 50 and 800 nanometers.

A solution of polyoctenamer (Vestenamer 8020, Evonik Industries, 1 g) in methylene chloride (100 mL) is added drop-wise to isopropyl alcohol (200 mL), with rapid mixing using a rotor-stator (IKA Turrax T25 homogenizer), resulting in the formation of spheres of between 50 and 800 nanometers. The resulting suspension is filtered and dried, and the particles (see FIG. 2) are then added directly to an 11.11 wt. % TCT ionomer solution in N,N-dimethylacetamide as a crack mitigant at an amount of 5% by weight of ionomer solids (Tetramer Technologies, Inc., consisting of a 60,000 molecular weight, multi-block co-polymer made up of 8,000 molecular weight, biphenyl segments with perfluorosulfonic acid side chains and hexafluoroisopropylidene-bisphenyl segments). Other suitable solvents include methanol, ethanol, isopropanol, or the like. TCT891 is a perfluorocyclobutane multi-block co-polymer with perfluorosulfonic acid side groups available from Tetramer Technologies, LLC. The structure is shown below. The molar ratio of biphenyl to hexafluoroisopropylidene biphenyl moieties is 2 to 1, and the ion exchange capacity of the polymer is 1.55 meq $H^+$/g ionomer. The overall number average molecular weight of the polymer by size exclusion chromatography is 60,000, while that of the biphenyl chains is about 8,000. The hexafluoroisopropylidene biphenyl groups are interspersed between the 8000 molecular weight biphenyl segments in a less defined way, because these are introduced individually during the polymerization instead of being added as an oligomer segment. The polydispersity of the polymer, defined as weight average molecular weight divided by number average molecular weight, is 1.3. The polymer is soluble in alcohols (methanol, ethanol, 1-propanol and isopropanol) and in polar aprotic solvents such as N,N-dimethylacetamide, N,N-dimethylformamide, and N-methylpyrrolidone.

Figure 3:
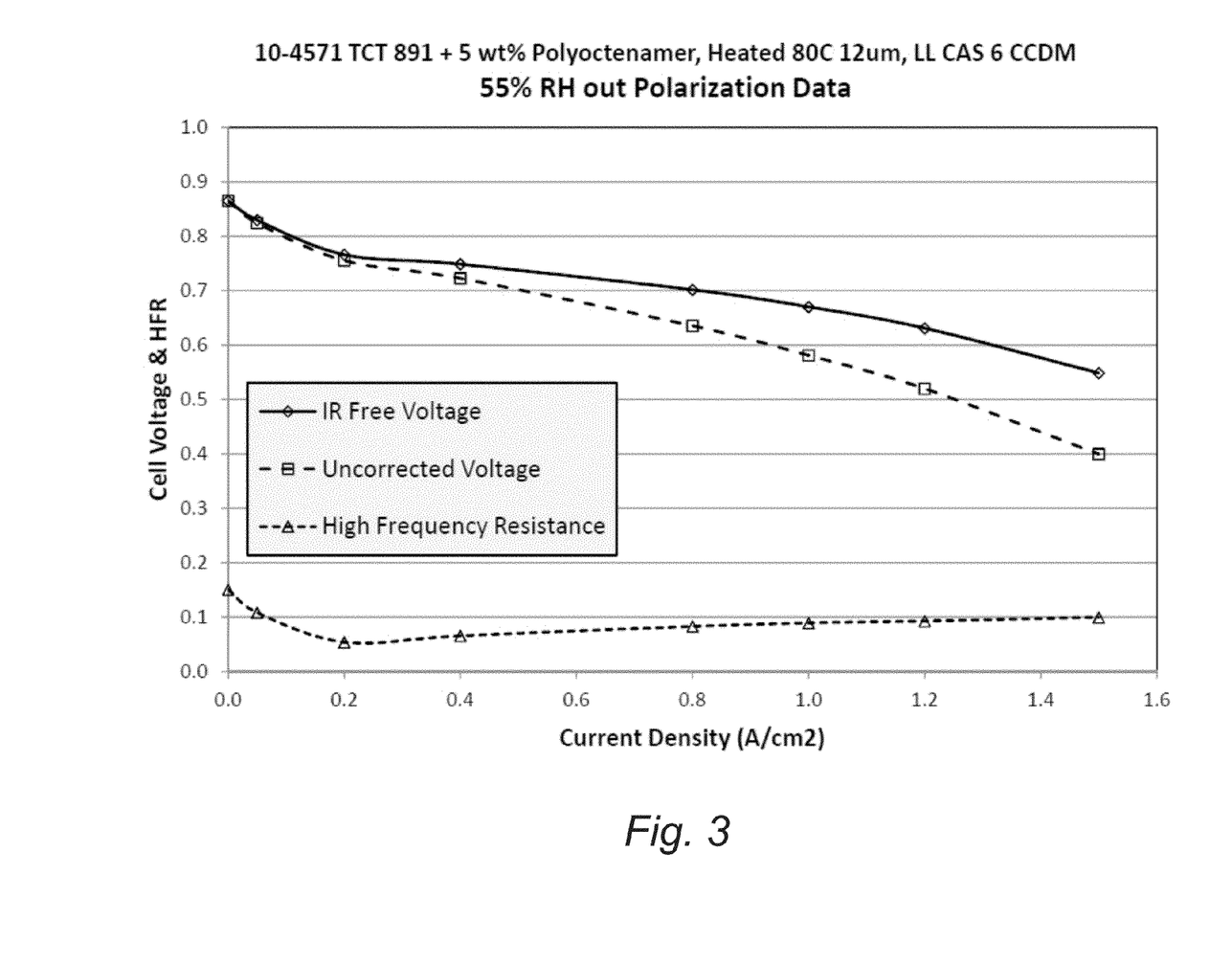
FIG. 3 provides a plot of cell voltage (volts) and high frequency resistance versus current density ($A/cm^2$) for a fuel cell membrane formed from a mixture of polyoctenamer spheres and an ionomer.

Polymers with this structure are further described in U.S. Pat. Nos. 7,897,691; 7,960,046; 7897,691; and 8,053,530, the entire disclosures of which are hereby incorporated by reference. The mixture is then solution cast onto window pane glass using a 6-mil Bird applicator (Gardco) and an Erichsen coater operated at a coating speed of 12.5 mm per second. The wet film is then dried at 80° C. (platen set temperature) to form a dry ionomer membrane, which on immersion in water forms a free-standing film. The air-dried film is useful as a polyelectrolyte membrane in hydrogen/air fuel cells. The membrane is assembled between two pieces of carbon fiber diffusion media, each coated with a first microporous layer and a second catalyst layer of Pt on graphitized carbon (Tanaka at 0.4 mg Pt per square cm of active area). A plot of cell voltage (volts) versus current density (mA/cm2) is plotted in FIG. 3. The rubber particles prevent crack propagation through the membrane under mechanical duress such as repeated membrane hydration and dehydration cycles and with physical bending of the membrane. Polyoctenamer is amenable to many different chemical reactions of olefins allowing diverse chemical functionality including sulfonation, epoxidation, hydroxylation and hydrogenation.

Example 2

Perfluorocyclobutane (PFCB)-Based Polymer Nanospheres

Figure 4:
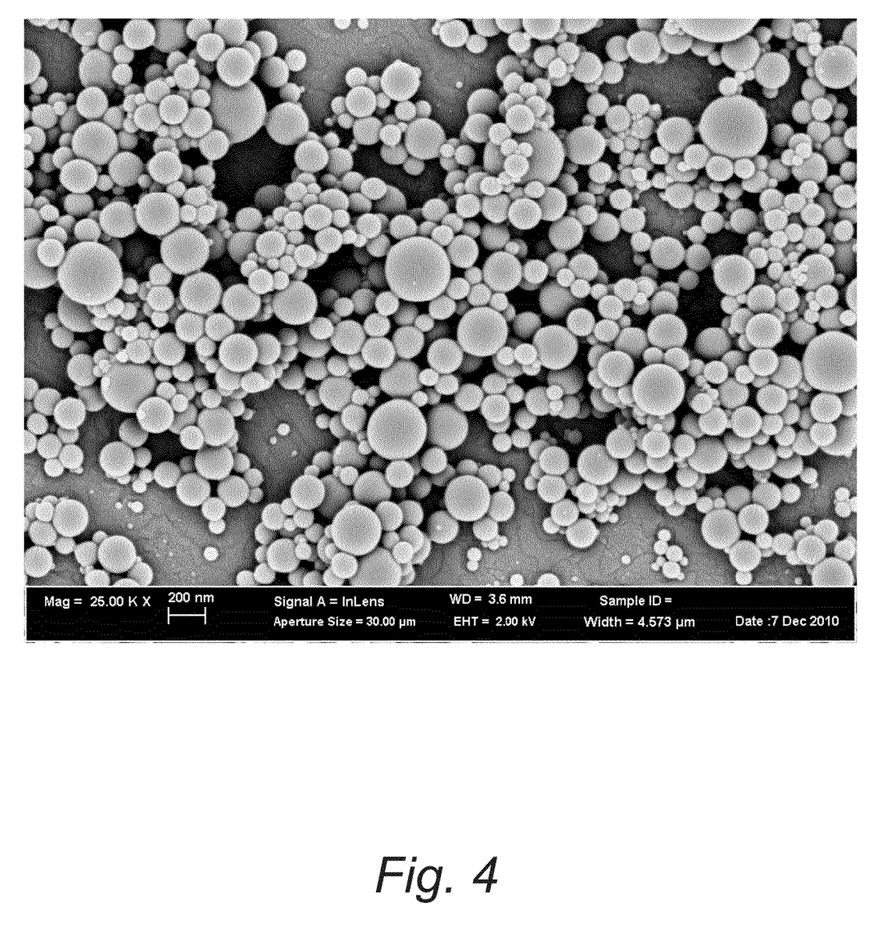
FIG. 4 is a scanning electron micrograph of perfluorocyclobutane (PFCB) spheres having a diameter between 50 and 200 nanometers.

A solution of a 60,000 molecular weight perfluorocyclobutane multi-block copolymer composed of 8,000 molecular weight segments of biphenyl-bis-perfluorovinyl ether segments connected with segments of hexafluoro-biphenyl-bis-perfluorovinyl ether segments (Tetramer Technologies, 1 gram) in methylene chloride (10 mL) is added drop wise to isopropyl alcohol (150 mL), while being mixed at a rapid rate using a rotor-stator (IKA Turrax T25 homogenizer). A suspension of spheres of between 50 to 200 nanometers in diameter is formed. The resulting suspension is filtered and dried, and then the nanoparticles (see FIG. 4) are added directly to an 11.11 wt. % solids ionomer solution as a crack mitigant at a 5 wt. % solids loading in methanol. PFCB base polymer in the 50 to 200 nm diameter size range is shown in FIG. 4.

Example 3

Sulfonated Perfluorocyclobutane (PFCB) with Mixed Particulate Morphology

Figure 5:
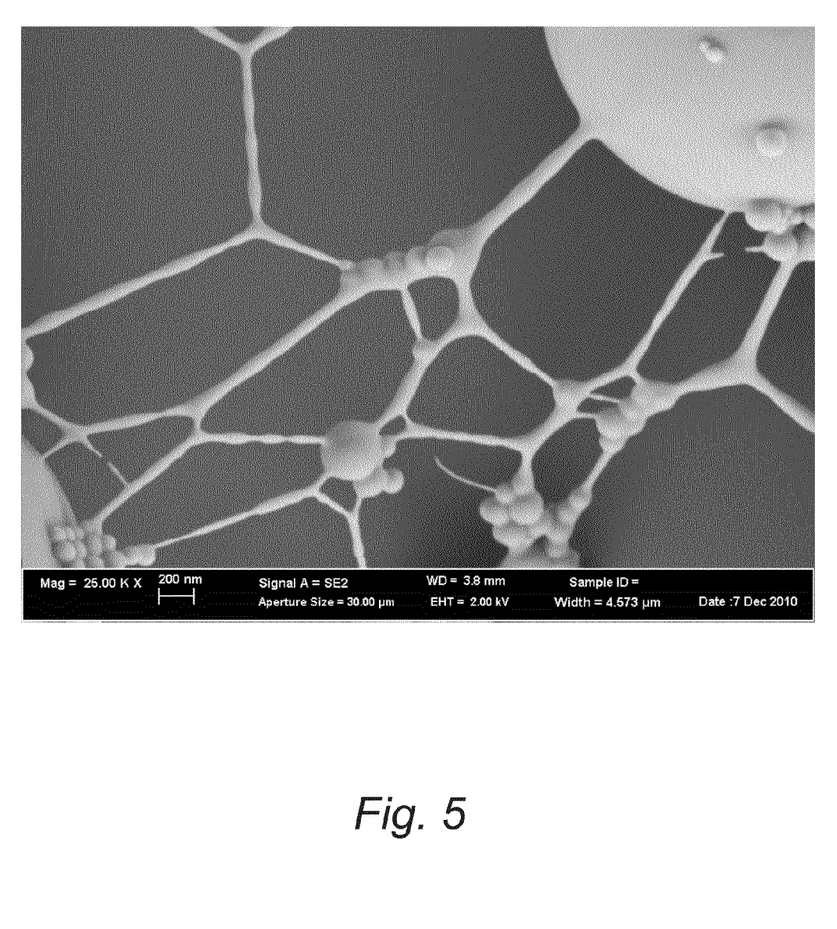
FIG. 5 is a scanning electron micrograph of sulfonated perfluorocyclobutane spheres having a diameter between 50 and 800 nanometers connected by strands of 20 to 50 nm in length.
Figure 6:
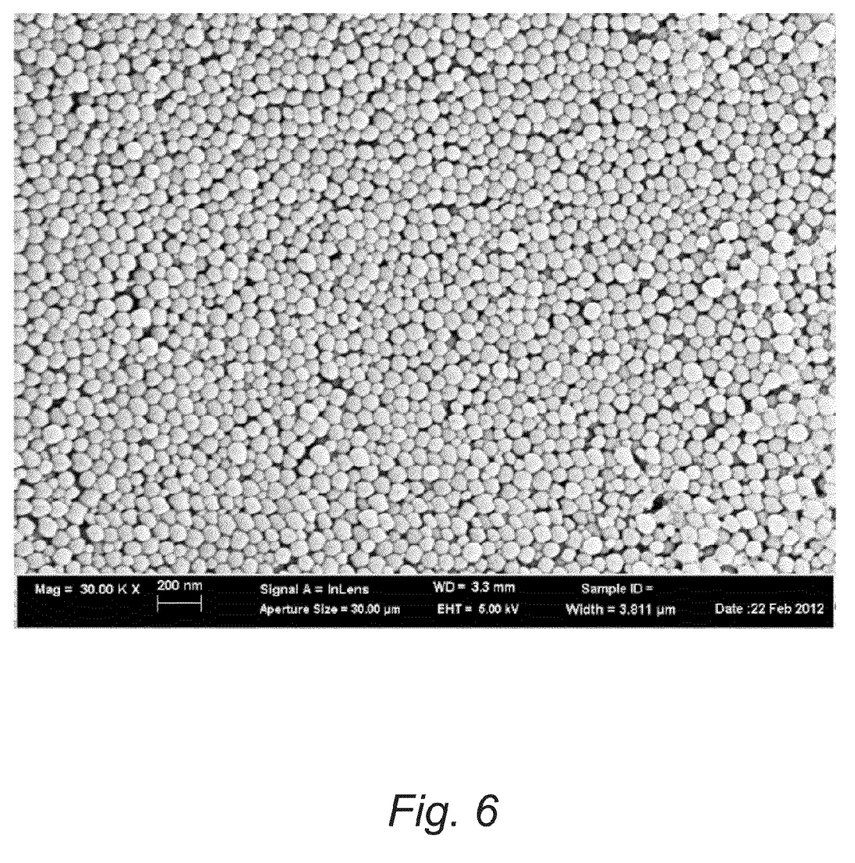
FIG. 6 is a scanning electron micrograph of an emulsion polymerized polybutadiene.
Figure 7:
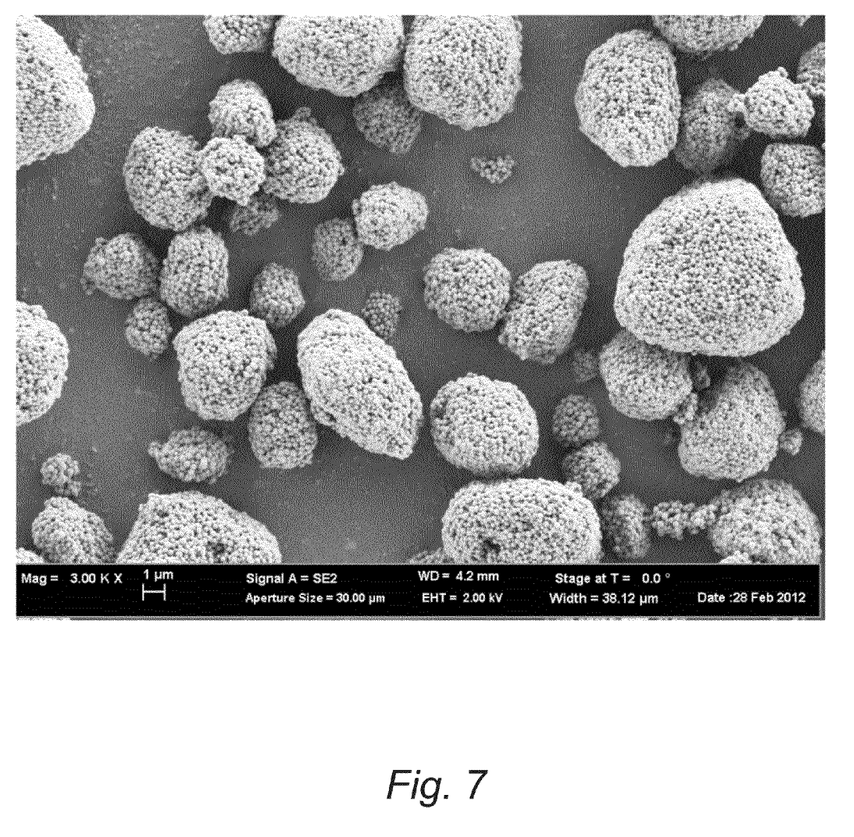
FIG. 7 is a scanning electron micrograph of Kynar 2751 spheres having a diameter between 50 and 200 nanometers.

Sulfonated PFCB (Tetramer Technology, 1 g, consisting of a multi-block co-polymer of biphenyl moieties with perfluorosulfonic acid side chains and hexafluoroisopropylidene-bisphenyl moieties)) is dissolved in methanol (10 mL) and then added drop-wise to hexanes (150 mL) while being mixed at maximum speed with an IKA Turrax T25 homogenizer which results in the formation of ionomer spheres ranging between 50 and 200 nanometers in diameter. Some of the spheres are connected by strands of between 20 to 50 nm in length. The resulting suspension is filtered and dried and then the particles (see FIG. 5) are added directly at 5 wt. % based on total polymer solids to an ionomer solution in water such as D70-20BS (Solvey Solexis) before coating. The mixture is solution cast onto window pane glass using a 6-mil Bird applicator (Gardco) and an Erichsen coater operated at a coating speed of 12.5 mm per second. The wet film is then dried at 80 degrees C. (platen set temperature) to form a dry ionomer membrane, which forms a free-standing film on immersion in water. The air dried film is useful as a polyelectrolyte membrane in hydrogen and air fuel cells. The membrane is assembled between two pieces of carbon fiber diffusion media, each coated with a first microporous layer and a second catalyst layer of Pt on graphitized carbon (Tanaka at 0.4 mg Pt per square cm of active area). The particles prevent crack propagation through the membrane under mechanical duress such as repeated membrane hydration and dehydration cycles and with physical bending of the membrane. When sulfonated PFCB ionomer (0.5 g) to $CH_3OH$ (50 mL) is added to $CH_2Cl_2$ (200 mL), nano-particulate strands are formed.

Example 4

Preparation of Polybutadiene Emulsion Latex

To an 6.5 ounce beverage bottle equipped with a rubber septum, magnetic stirrer, and an argon needle inlet is charged 150 mL of water that has been sparged with argon for 30 minutes. Butadiene (25 g), carbon tetrachloride (2.5 g), sodium oleate (0.75 g) and potassium persulfate (0.13 g) are added and the bottle is heated in an oil bath at 50° C. for 3 days. Water (50 mL) containing 5 mL of chlorine gas is added to prevent the emulsion particles from coagulating and the latex is dialyzed for 1 week with frequent water changes. The latex is then freeze-dried to obtain 150-nm diameter, emulsion particles of polybutadiene rubber. The particles at between 5 and 15 wt. % loading based on ionomer solids are added to a solution of Nafion DE2020 in aqueous 1-propanol at 20 wt. % solids or to sulfonated perfluorocyclobutane ionomer (Tetramer Technologies, Inc., consisting of a multi-block co-polymer of biphenyl moieties with perfluorosulfonic acid side chains and hexafluoroisopropylidene-bisphenyl moieties) in 1-propanol at 11.11 wt. % solids and the dispersions are coated onto windowpane glass using a 6-mil Bird applicator (Gardco) and an Erichsen coater. The membranes are then dried on the platen at 80° C. and then the coated membrane films are floated off the glass with water and air dried. The films are resistant to cracking when creased because the rubber particles prevent crack propagation. Emulsion polymerized chloroprene behaves similarly. Particles of syndiotactic poly-1,2-butadiene also behave similarly. Because the polymer particles are semi-crystalline, treatment with chlorine water is not necessary to maintain particle integrity. These particles are made in the same way as those made with polyoctenamer.

Example 5

Polyelectrolyte Membranes Containing Emulsion Particles of Polyvinylidene Fluoride Rubber Kynar Flex 2751 (Arkema) consists of about 150-nm diameter particles of polyvinylidene fluoride rubber. The particles are added at between 5 and 15 wt. % loading based on ionomer solids to Nafion DE2020 in aqueous 1-propanol at 20 wt. % solids or to sulfonated perfluorocyclobutane ionomer (Tetramer Technologies, Inc., consisting of a multi-block co-polymer of biphenyl moieties with perfluorosulfonic acid side chains and hexafluoroisopropylidene-bisphenyl moieties) in 1-propanol at 11.11 wt. % solids using an IKA homogenizer (Turrax T25). The dispersions are coated onto windowpane glass using a 6-mil Bird applicator (Gardco) and an Erichsen coater. The membranes are then dried on the platen at 80° C. and then the coated membrane films are floated off the glass with water and air dried. These films are resistant to cracking when creased because the rubber particles prevent crack propagation through the membrane.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A membrane electrode assembly for a fuel cell, the membrane electrode assembly comprising:
    an anode catalyst layer;
    a cathode catalyst layer; and
    an ion conducting membrane interposed between the anode catalyst layer and the cathode catalyst layer, the ion conducting membrane including an ion conducting polymer having sulfonic acid groups and rubber particulates, the rubber particulates having an average spatial dimension less than about 600 nanometers wherein the rubber particulates include a component selected from the group consisting of polyoctenamer, polystyrene-polybutadiene, syndiotactic poly-1,2-butadiene, and combinations thereof.

2. The membrane electrode assembly of claim 1 wherein the rubber particulates are present in an amount from about 0.1 to 50 weight percent of the total weight of the ion conducting membrane.

3. The membrane electrode assembly of claim 1 wherein the rubber particulates are present in an amount from about 5 to 10 weight percent of the total weight of the ion conducting layer.

4. The membrane electrode assembly of claim 1 wherein the rubber particulates have an average spatial dimension less than about 300 nanometers.

5. The membrane electrode assembly of claim 1 wherein the rubber particulates are substantially spherical.

6. The membrane electrode assembly of claim 5 wherein the rubber particulates have an average diameter from about 50 to 400 nanometers in the membrane.

7. The membrane electrode assembly of claim 1 wherein the rubber particulates are fibers.

8. The membrane electrode assembly of claim 1 wherein the rubber particulates comprise a network of spheres connected by fibers.

9. The membrane electrode assembly of claim 1 wherein the ion conducting polymer having sulfonic acid groups includes a component selected from the group consisting of perfluorosulfonic acid (PFSA) polymers, polymers having perfluorocyclobutyl moieties, and combinations thereof.

10. The membrane electrode assembly of claim 9 wherein the ion conducting polymer having sulfonic acid groups includes a copolymer containing a polymerization unit having the following formula:

where m represents an integer of from 0 to 3, q represents an integer of from 1 to 12, r represents 0 or 1, and $X^1$ represents a fluorine atom or a trifluoromethyl group; and
    tetrafluoroethylene.

11. The membrane electrode assembly of claim 10 wherein the ion conducting polymer having sulfonic acid groups includes polymer segments 3 and 4:

wherein:
    $E_1$, $E_2$ are each independently an aromatic-containing and/or aliphatic-containing moiety;
    X is an —OH, a halogen, an ester, or d is the number of $(SO_2X)_d$ attached to $E_1$;
    $P_1$, $P_2$, $P_3$, $P_4$ are each independently: absent, —O—, —S—, —SO—, —CO—, —$SO_2$—, —NH—, $NR_2$—, or —$R_3$—; and
    $R_2$ is $C_{1-25}$ alkyl, $C_{1-25}$ aryl or $C_{1-25}$ arylene;
    $R_3$ is $C_{1-25}$ alkylene, $C_{1-25}$ perfluoroalkylene, perfluoroalkyl ether, alkylether, or $C_{1-25}$ arylene;
    $R_4$ is trifluoromethyl, $C_{1-25}$ alkyl, $C_{1-25}$ perfluoroalkylene, $C_{1-25}$ aryl, or another $E_1$ group;
    $R_8(SO_2X)_d$ is a sulfonated aliphatic or aromatic containing moiety; and
    $Q_1$, $Q_2$ are each independently a fluorinated cyclobutyl moiety.

12. The membrane electrode assembly of claim 9 wherein the ion conducting polymer having sulfonic acid groups includes perfluorocyclobutyl moieties having the following formulae:

13. The membrane electrode assembly of claim 9 wherein the ion conducting polymer having sulfonic acid groups includes polymer segments 1 and 2:

$$[E_1(SO_2X)_d]\text{—}P_1\text{-}Q_1\text{-}P_2 \qquad 1$$

$$E_2\text{-}P_3\text{-}Q_2\text{-}P_4 \qquad 2$$

wherein:
- $E_1(SO_2X)_d$ is a sulfonated aromatic containing moiety;
- $E_1$ is an aromatic containing moiety;
- $E_2$ is an unsulfonated aromatic-containing and/or aliphatic-containing moiety;
- X is an —OH, a halogen, an ester, or

- d is the number of $(SO_2X)_d$ attached to $E_1$;
- $P_1$, $P_2$, $P_3$, $P_4$ are each independently: absent, —O—, —S—, —SO—, —CO—, —SO$_2$—, —NR$_1$H—, NR$_2$—, or —R$_3$—;
- $R_2$ is $C_{1-25}$ alkyl, $C_{1-25}$ aryl or $C_{1-25}$ arylene;
- $R_3$ is $C_{1-25}$ alkylene, $C_{1-25}$ perfluoroalkylene, perfluoroalkyl ether, alkylether, or $C_{1-25}$ arylene;
- $R_4$ is trifluoromethyl, $C_{1-25}$ alkyl, $C_{1-25}$ perfluoroalkylene, $C_{1-25}$ aryl, or another $E_1$ group; and
- $Q_1$, $Q_2$ are each independently a fluorinated cyclobutyl moiety.

14. The membrane electrode assembly of claim 9 wherein the ion conducting polymer having sulfonic acid groups includes polymer segments 5 and 6:

$$E_1(SO_2X)_d\text{—}P_1\text{-}Q_1\text{-}P_2 \qquad 5$$

$$E_2\text{-}P_3\text{-}Q_2\text{-}P_4 \qquad 6$$

connected by a linking group $L_1$ to form polymer units 7 and 8:

7

8 wherein:
- $E_1(SO_2X)_d$ is a sulfonated aromatic-containing moiety;
- $E_2$ is an unsulfonated aromatic-containing and/or aliphatic-containing moiety;
- $L_1$ is a linking group;
- X is an —OH, a halogen, an ester, or

- d is a number of $(SO_2X)$ functional groups attached to $E_1$;
- $P_1$, $P_2$, $P_3$, $P_4$ are each independently absent, —O—, —S—, —SO—, —SO$_2$—, —CO—, —NH—, NR$_2$—, —R$_3$—, and
- $R_2$ is $C_{1-25}$ alkyl, $C_{1-25}$ aryl or $C_{1-25}$ arylene;
- $R_3$ is $C_{1-25}$ alkylene, $C_{1-25}$ perfluoroalkylene, or $C_{1-25}$ arylene;
- $R_4$ is trifluoromethyl, $C_{1-25}$ alkyl, $C_{1-25}$ perfluoroalkylene, $C_{1-25}$ aryl, or another $E_1$ group;
- $Q_1$, $Q_2$ are each independently a fluorinated cyclobutyl moiety;
- i is a number representing repetition of polymer segment 5; and,
- j is a number representing repetition of a polymer segment 6.

15. The membrane electrode assembly of claim 10 wherein the ion conducting polymer having sulfonic acid groups includes polymer segments 9 and 10:

$$E_1(SO_2X)_d\text{—}P_1\text{-}Q_1\text{-}P_2 \qquad 9$$

$$E_2(SO_2X)_f\text{—}P_3 \qquad 10$$

wherein:
- $E_1$, $E_2$ is an aromatic or aliphatic-containing moiety wherein at least one of $E_1$ and $E_2$ include an aromatic group substituted with —SO$_2$X;
- X is an —OH, a halogen, an ester, or

- d is the number of $(SO_2X)$ functional groups attached to $E_1$;
- f is the number of $(SO_2X)$ functional groups attached to $E_2$;
- $P_1$, $P_2$, $P_3$ are each independently absent, —O—, —S—, —SO—, SO$_2$—, —CO—, —NH—, NR$_2$—, —R$_3$—, and
- $R_2$ is $C_{1-25}$ alkyl, $C_{1-25}$ aryl or $C_{1-25}$ arylene;
- $R_3$ is $C_{1-25}$ alkylene, $C_{1-25}$ perfluoroalkylene, perfluoroalkyl ether, alkyl ether, or $C_{1-25}$ arylene;
- $R_4$ is trifluoromethyl, $C_{1-25}$ alkyl, $C_{1-25}$ perfluoroalkylene, $C_{1-25}$ aryl, or another $E_1$ group; and
- $Q_1$ is a fluorinated cyclobutyl moiety,
- with the proviso that when d is greater than zero, f is zero and when f is greater than zero, d is zero.

16. The membrane electrode assembly of claim 1 wherein the rubber particulates include polyoctenamer.

17. The membrane electrode assembly of claim 1 wherein the polyoctenamer is sulfonated.

18. A fuel cell comprising:
- a membrane electrode assembly including:
  - an anode catalyst layer;
  - a cathode catalyst layer;
  - an ion conducting membrane interposed between the anode catalyst layer and the cathode catalyst layer, the ion conducting membrane including an ion conducting polymer having sulfonic acid groups and rubber particulates, the rubber particulates having an average spatial dimension less than about 600 nanometers wherein the rubber particulates include component selected from the group consisting of polyoctenamer, polystyrene-polybutadiene, syndiotactic poly-1,2-butadiene, and combinations thereof;
an anode flow field plate disposed over the anode catalyst layer;
a cathode flow field plate disposed over the catalyst layer;
a first gas diffusion layer interposed between the anode flow field plate and the anode catalyst layer; and
a second gas diffusion layer interposed between the cathode flow field plate and the catalyst layer.

19. The fuel cell of claim 18 wherein the rubber particulates are present in an amount from about 0.1 to 50 weight percent of the total weight of the ion conducting membrane.

20. The fuel cell of claim 18 wherein the rubber particulates are in an amount from about 5 to 10 weight percent of the total weight of the ion conducting membrane.

21. The fuel cell of claim 18 wherein the ion conducting polymer having sulfonic acid groups includes a component selected from the group consisting of perfluorosulfonic acid (PFSA) polymers, polymers having perfluorocyclobutyl moieties, and combinations thereof.

22. The fuel cell of claim 18 wherein the rubber particulates include polyoctenamer.

* * * * *